A. PAYNE.
MULTIPLE EXPOSURE ATTACHMENT FOR CAMERAS.
APPLICATION FILED NOV. 10, 1920.

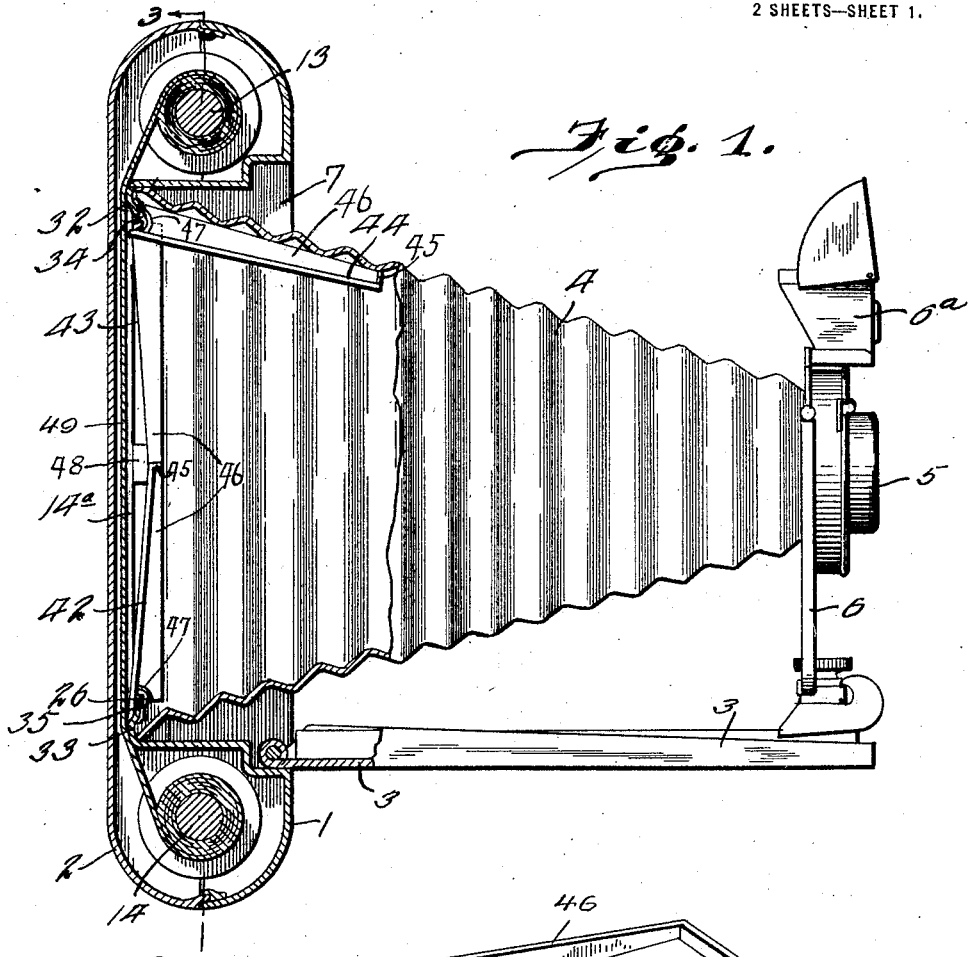

1,416,502.

Patented May 16, 1922.
2 SHEETS—SHEET 2.

INVENTOR.
Artie Payne
BY
Geo. P. Kimmel
ATTORNEY.

UNITED STATES PATENT OFFICE.

ARLIE PAYNE, OF PARAGOULD, ARKANSAS.

MULTIPLE-EXPOSURE ATTACHMENT FOR CAMERAS.

1,416,502.        Specification of Letters Patent.    Patented May 16, 1922.

Application filed November 10, 1920. Serial No. 423,059.

*To all whom it may concern:*

Be it known that I, ARLIE PAYNE, a citizen of the United States, residing at Paragould, in the county of Greene and State of Arkansas, have invented certain new and useful Improvements in Multiple-Exposure Attachments for Cameras, of which the following is a specification.

This invention relates to cameras and more particularly to a multiple exposure attachment for a camera whereby a plurality of exposures may be taken on a single photographic plate or film.

One of the objects of the invention is the construction of a camera attachment to be positioned in proximity to a photographic plate or film whereby different size exposures may be taken on the same plate or film.

Another object of the invention resides in a novel and improved type of shutter or light excluding door positioned in front of a plate or film whereby a series of different size exposures may be taken on the same plate or film in rapid succession and according to predetermined positions.

A still further object of the invention is directed to a novel type of sectional shutter door or light excluding structure, including individual door operating and locking devices whereby the operator may observe which door has been actuated.

With these objects in view and others which will be manifest and suggested as the nature and purpose of the invention are revealed in the following specification and drawings, wherein I have shown a practical, yet preferred embodiment thereof.

Figure 1 is a side view with parts broken away to show the doors when used in connection with a folding camera.

Fig. 2 is a perspective view of one of the doors.

Figure 3:
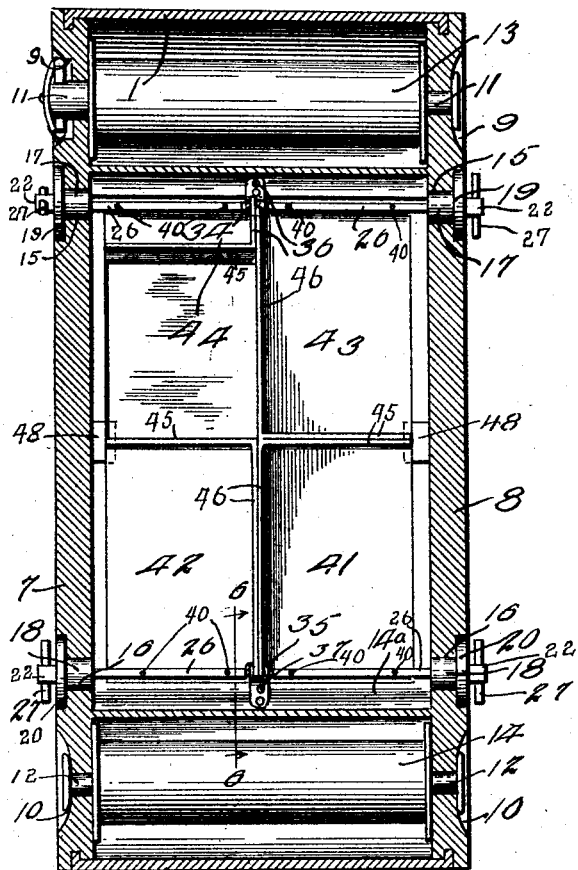
Fig. 3 is a vertical section taken on line 3—3 of Fig. 1 with the outer casing of the camera removed and the bellows not shown.
Figure 6:
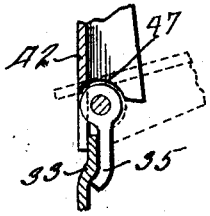
Fig. 6 is a view taken on the line 6—6 of Fig. 3.
Figure 4:
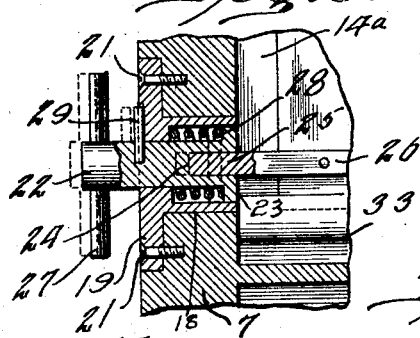
Fig. 4 is a detail, partly in section showing the door actuating means.

Referring to Figs. 1 and 2, I have illustrated my invention as applied to a folding camera having the usual front and rear sectional casing 1, 2, hinged door 3 supporting the bellows 4, lens 5 and finder 6ª, all of which are well known and common to this type of camera. In addition, the sides 7, 8 of the camera are recessed at 9, 10 in their upper and lower portions respectively to receive the centers 11, 12 for the spools 13, 14 positioned above and below the frame 14ª and between the sides as clearly shown in Fig. 3 which is also of the common and well known form.

Figure 5:
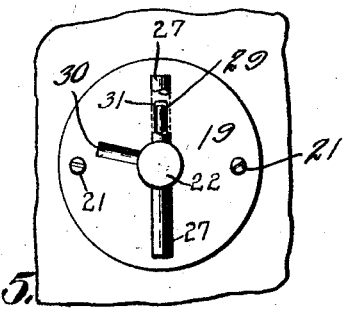
Fig. 5 is a detail view showing the locking device for the doors.

Directly below and above the recessed portions 9, 10 there are provided aligned apertures 15, 16 which receive the bearings 17, 18 therein, said bearings having circular plates 19, 20 formed integral therewith and seated in depressions in the sides 7, 8 by screws 21 as clearly shown in Fig. 5. A short spindle 22 provided with a flange 23 extends within each of the said bearings, each of said spindles having a squared opening 24 to receive the end 25 of the squared shaft 26 secured to one of the shutters subsequently to be described. The outer end of each spindle has secured thereto a turning rod 27 which permits the spindle to be drawn outwardly against the resistance of a short coiled spring 28 within the bearing, and a locking pin 29 carried by said spindle is adapted to be seated in the recesses 30, 31 formed in the plates as illustrated in Fig. 5.

Intermediately of the downturned and upturned portions 32, 33 of the frame section 1 there are provided bearing plates 34, 35 secured at 36, 37 to receive an inner reduced end 38 of each squared shaft 26 which carries an individual shutter fastened as at 40. As shown on Fig. 3, four shutters 41, 42, 43, 44 are provided one for each of the respective shafts, each shutter having an end flange 45 and a tapering side flange 46 which is partly cut away as at 47 in proximity to the reduced inner ends of the shaft 26. It will be understood that the tapering side flanges and the meeting edges of the respective upper and lower shutters slightly overlap, providing a light excluding joint so that seams will not be formed when the film 49 is developed.

In the accompanying drawings, I have illustrated my invention embodied in one form by way of example, and which in practice has been found to be highly satisfactory in obtaining the desired results. It will be seen however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:—

1. A multiple exposure attachment for cameras, comprising a frame having alined apertures in the sides thereof, bearing plates secured to the top, and bottom and intermediately of the sides of said frame, shafts of angular cross section and having end spindles mounted between the bearing plates, shutters attached to said shafts of angular cross section, and having flanged, light excluding meeting edges, and means for successively operating said shafts and shutters and locking the same to the sides of the camera.

2. A multiple exposure attachment for cameras comprising a frame having aligned apertures in the sides thereof, bearing plates secured to the top and bottom and intermediate the sides of said frame, squared shafts having end spindles mounted between said bearing plates and the frame, spindles having squared openings receiving the squared ends of each of said shafts, rectangular shutters attached to said squared shafts and having tapered, flanged meeting edges forming light excluding joints and operable by the respective shafts, and means whereby said shafts and shutters may be independently operated and locked.

3. A multiple exposure attachment for cameras comprising a frame having aligned apertures in the sides thereof, bearing plates having slots therein secured to the top and bottom and intermediate the sides of the frame, squared shafts having end spindles, horizontally and pivotally mounted between said bearing plates and the frame, spindles having squared openings therein for receiving the squared ends of each of said shafts for rotating the same, a flange carried by each of said spindles, a coiled spring seated within each of said bearings and against the flange, a locking pin also carried by each of the spindles for engagement in a slot in the side of the bearing plate, rectangular shutters attached to said shafts and having light excluding, flanged meeting edges operable with said shafts and means for withdrawing said locking pin from said slot to rotate said shaft and shutter for the purpose specified.

In testimony whereof, I affix my signature hereto.

ARLIE PAYNE.